(12) United States Patent
Datla et al.

(10) Patent No.: US 7,735,140 B2
(45) Date of Patent: Jun. 8, 2010

(54) METHOD AND APPARATUS PROVIDING UNIFIED COMPLIANT NETWORK AUDIT

(75) Inventors: Krishnam Raju Datla, Union City, CA (US); Srinivasa Beereddy, Fremont, CA (US); Prasanthi Somepalli, San Jose, CA (US); Parthasarathy Venkatavaradhan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1009 days.

(21) Appl. No.: 11/148,489

(22) Filed: Jun. 8, 2005

(65) Prior Publication Data
US 2005/0273851 A1 Dec. 8, 2005

Related U.S. Application Data

(60) Provisional application No. 60/521,632, filed on Jun. 8, 2004.

(51) Int. Cl.
*G06F 11/00* (2006.01)
(52) U.S. Cl. .......................................... 726/25; 726/22
(58) Field of Classification Search .................. 726/1, 726/25, 14
See application file for complete search history.

(56) References Cited

U.S. PATENT DOCUMENTS

| | | | |
|---|---|---|---|
| 4,617,643 | A | 10/1986 | Klock et al. |
| 4,686,623 | A | 8/1987 | Wallace |
| 4,972,264 | A | 11/1990 | Bishop et al. |
| 6,219,706 | B1 | 4/2001 | Fan et al. |
| 6,243,862 | B1 | 6/2001 | Lebow |
| 6,282,546 | B1 | 8/2001 | Gleichauf et al. |
| 6,301,668 | B1 | 10/2001 | Gleichauf et al. |
| 6,324,656 | B1 | 11/2001 | Gleichauf et al. |
| 6,405,318 | B1 | 6/2002 | Rowland |
| 6,421,719 | B1 | 7/2002 | Lewis et al. |
| 6,477,651 | B1 | 11/2002 | Teal |
| 6,487,666 | B1 | 11/2002 | Shanklin et al. |
| 6,502,112 | B1 | 12/2002 | Baisley |
| 6,523,172 | B1 | 2/2003 | Martinez-Guerra et al. |
| 6,597,666 | B1 | 7/2003 | Hemzal et al. |
| 6,601,059 | B1 | 7/2003 | Fries |
| 6,615,257 | B2 | 9/2003 | Lee et al. |
| 6,636,972 | B1 | 10/2003 | Ptacek et al. |

(Continued)

OTHER PUBLICATIONS

Cisco, "Using the Cisco IOS Command Line Interface", Oct. 2, 1998, Chapter 3, 8 pages.

*Primary Examiner*—Jung Kim
*Assistant Examiner*—Samson B Lemma
(74) *Attorney, Agent, or Firm*—Hickman Palermo Truong & Becker LLP

(57) ABSTRACT

Information flow between network elements in a network enables a management system to capture a security knowledge base and to perform a static analysis of the network. In one embodiment, a method for performing a network security audit based on information flows among network elements comprises the machine-implemented steps of obtaining a network inventory that identifies one or more network elements of a packet-switched network; determining how information packets flow through the one or more network elements; determining a first threat level for each of the one or more network elements; determining a second threat level for the network as a whole; and providing a report of a network security audit based on the first and second threat levels.

40 Claims, 6 Drawing Sheets

U.S. PATENT DOCUMENTS

| | | |
|---|---|---|
| 6,775,657 B1 | 8/2004 | Baker |
| 6,839,850 B1 | 1/2005 | Campbell et al. |
| 6,920,458 B1 | 7/2005 | Chu et al. |
| 6,950,865 B1 | 9/2005 | Depaolantonio |
| 6,968,377 B1 | 11/2005 | Gleichauf et al. |
| 7,032,014 B2 | 4/2006 | Thiyagarajan et al. |
| 7,113,989 B2 | 9/2006 | Murray et al. |
| 7,216,298 B1 | 5/2007 | Ballard et al. |
| 7,284,009 B2 | 10/2007 | Perrow |
| 7,287,069 B1 | 10/2007 | Kavasseri et al. |
| 7,376,719 B1 | 5/2008 | Shafer et al. |
| 7,376,969 B1* | 5/2008 | Njemanze et al. ............. 726/22 |
| 7,418,733 B2* | 8/2008 | Connary et al. ............... 726/25 |
| 7,457,884 B2* | 11/2008 | Makioka .................... 709/250 |
| 2002/0004827 A1 | 1/2002 | Ciscon et al. |
| 2003/0028257 A1 | 2/2003 | Crawford et al. |
| 2003/0061568 A1 | 3/2003 | Dijkstra |
| 2003/0098887 A1 | 5/2003 | Li |
| 2003/0115305 A1 | 6/2003 | Murray et al. |
| 2003/0226131 A1 | 12/2003 | Li |
| 2004/0030771 A1 | 2/2004 | Strassner |
| 2004/0040016 A1 | 2/2004 | Pearce et al. |
| 2004/0111499 A1 | 6/2004 | Dobrowski et al. |
| 2004/0117624 A1* | 6/2004 | Brandt et al. ............... 713/166 |
| 2004/0153536 A1 | 8/2004 | Strassner |
| 2004/0179142 A1 | 9/2004 | Fang |
| 2004/0205737 A1 | 10/2004 | Margaliot et al. |
| 2004/0210654 A1* | 10/2004 | Hrastar ...................... 709/224 |
| 2004/0230681 A1 | 11/2004 | Strassner et al. |
| 2005/0004942 A1 | 1/2005 | Madsen et al. |
| 2005/0015624 A1* | 1/2005 | Ginter et al. ................ 713/201 |
| 2005/0108387 A1 | 5/2005 | Li et al. |
| 2005/0114479 A1 | 5/2005 | Watson-Luke |
| 2005/0149872 A1 | 7/2005 | Fong et al. |
| 2005/0174484 A1 | 8/2005 | Kwoh |
| 2005/0182969 A1* | 8/2005 | Ginter et al. ................ 713/201 |
| 2005/0262225 A1 | 11/2005 | Halpern et al. |
| 2006/0004680 A1 | 1/2006 | Robarts et al. |
| 2006/0195564 A1 | 8/2006 | Accardi et al. |
| 2007/0180432 A1 | 8/2007 | Gassner et al. |

\* cited by examiner

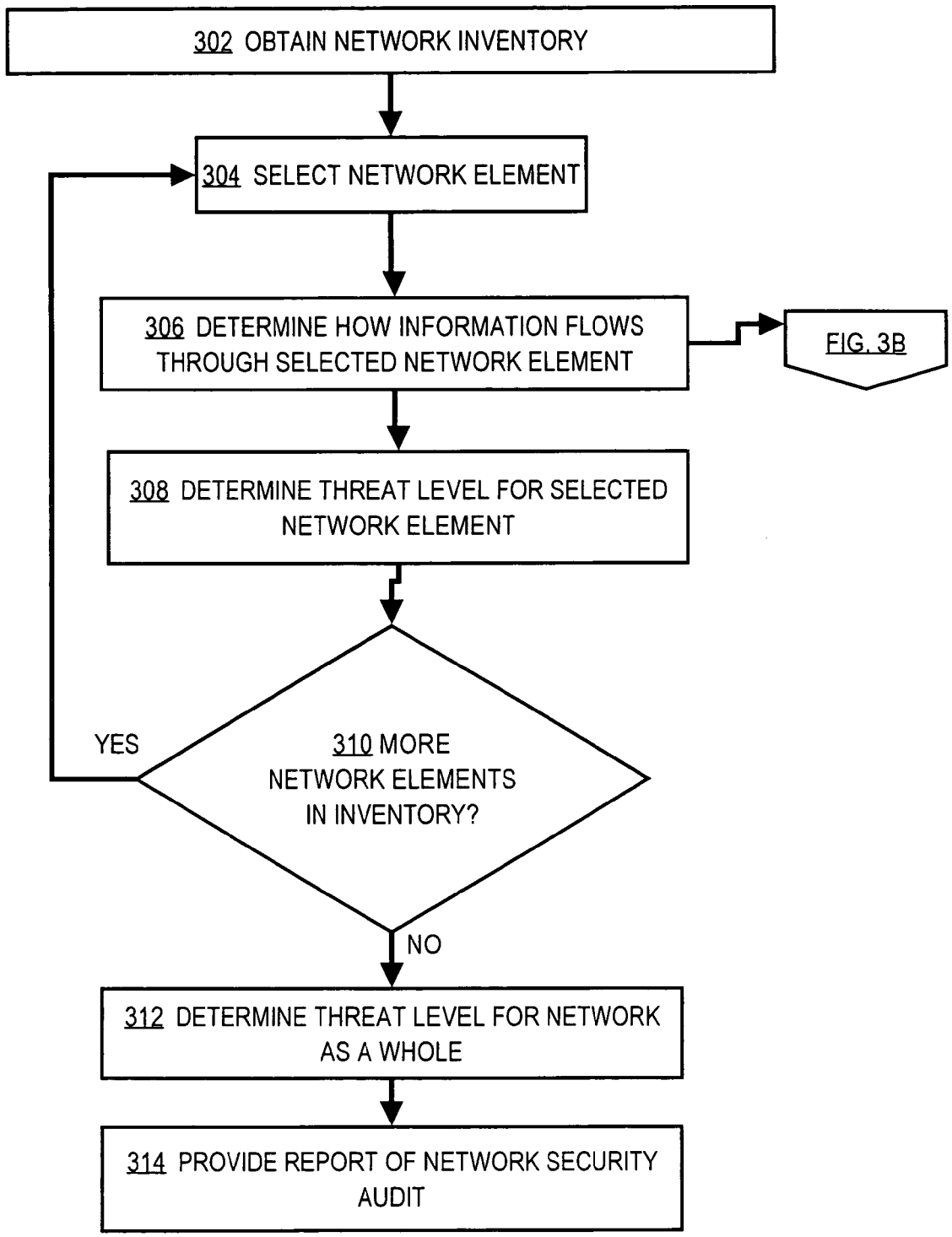

METHOD AND APPARATUS PROVIDING UNIFIED COMPLIANT NETWORK AUDIT

CROSS-REFERENCE TO RELATED APPLICATIONS; PRIORITY CLAIM

This application claims benefit of Provisional Appln. 60/521,632, filed Jun. 8, 2004, the entire contents of which is hereby incorporated by reference as if fully set forth herein, under 35 U.S.C. §119(e).

This application is related to U.S. application Ser. No. 11/148,709, filed Jun. 8, 2005, of Krishnam Raju Datla et al., entitled "Apparatus and Method for Intelligent Configuration Editor,"; U.S. application Ser. No. 11/148,725, filed Jun. 8, 2005, of Krishnam Raju Datla et al., entitled "Apparatus and Method for Programmable Network Intelligence,"; U.S. application Ser. No. 11/148,708, filed Jun. 8, 2005, of Krishnam Raju Datla et al., entitled "Apparatus and Method for Configuration Syntax and Semantic Validation Engine,"; and U.S. application Ser. No. 11/148,487, filed Jun. 8, 2005, of Krishnam Raju Datla et al., entitled "Apparatus and Method for Data Model Prediction," now U.S. Pat. No. 7,499,902.

FIELD OF THE INVENTION

The present invention generally relates to network management. The invention relates more specifically to approaches for determining whether a network conforms to security requirements.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks of the type commonly used by large business enterprises typically consist of a network of networks spanning geographical distances ranging from different buildings to different continents. Each individual network may contain various devices such as routers, switches, Wireless Access Points, etc.

Each network device offers a variety of services, which may include SNMP, FTP and Telnet services. While these services provide for accessing the network device, they also serve as open doors to the network device for malicious access. While security measures such as SNMP community strings, firewalls, IDS (Intrusion Detection Systems), ACLs (Access Control Lists), and VPNs (Virtual Private Networks) try to prevent malicious use by hackers, the level of security in the network is not always known, especially as the security configurations on various network devices across the network change.

Further, a network may contain security devices from different vendors requiring different configurations.

In addition, the adoption of new legal requirements relating to privacy and control of personal information has led network administrators to have increased concern about whether network devices and networks as a whole comply with the legal requirements. The failure of a network to achieve legislative compliance may mean that an enterprise as a whole is non-compliant. For example, network administrators wish to determine whether networks are in compliance with the following legislation, for example: Gramm-Leach-Bliley Act; HIPAA; Sarbanes-Oxley Act; USA PATRIOT Act; California SB 1386; and FDA 21 CFR Part 11.

The adoption of the foregoing legislation means that what was once just good business sense now may be a legal requirement. Rather than just risking the loss of customers, companies now face fines and other ramifications when networks are non-compliant. The risk of government involvement, in turn, would lead an increased risk that current and potential customers of an enterprise would know about its security failures.

These requirements also come at a time in which enterprises are opening their networks up to an ever-growing community of outside users. This means that companies must identify, authorize, and track users. Any attempted security breaches must be spotted and dealt with. In other words, security event management has become an integral part of legal compliance.

Bringing security up to regulatory standards can require many different changes in networks, such as consolidating databases that contain sensitive information and installing better identification and authorization software. Regulatory compliance requires that companies know their users and systems, and security event management lies at the heart of this process. However, past solutions and approaches are not designed to meet the foregoing challenges. Therefore, there is a clear need for improved network security audit approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram that illustrates a high level overview of one embodiment of a method for performing a network security audit;

DETAILED DESCRIPTION

Figure 1:
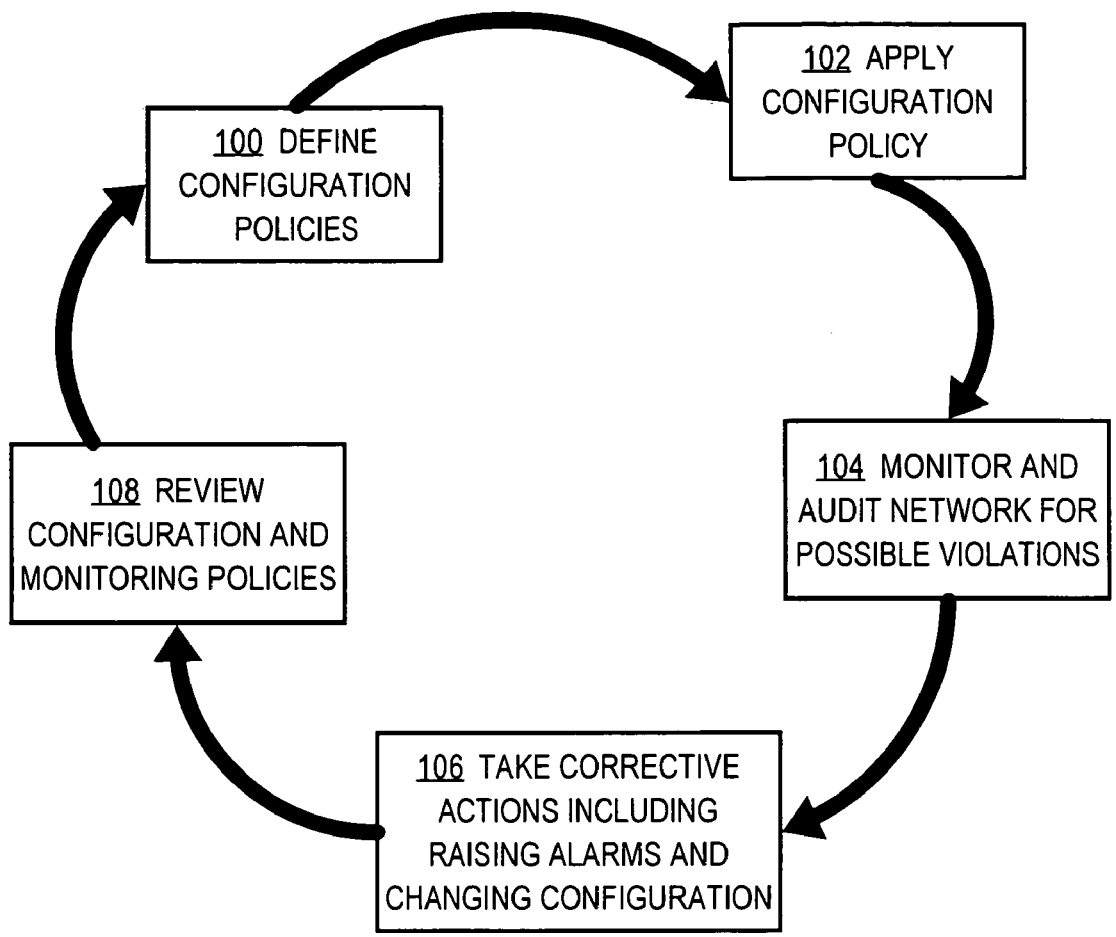
FIG. 1 is an illustration of management of network based on information flow.

A method and apparatus providing a unified compliant network audit is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Method of Providing a Unified Compliant Network Audit
   4.0 Implementation Mechanisms—Hardware Overview
   5.0 Extensions and Alternatives

1.0 General Overview

The needs identified in the foregoing Background, and other needs and objects that will become apparent for the following description, are achieved in the present invention, which comprises, in one aspect, a method for performing a network security audit based on information flows among network elements, comprising the machine-implemented steps of obtaining a network inventory that identifies one or more network elements of a packet-switched network; determining how information packets flow through the one or more network elements; determining a first threat level for each of the one or more network elements; determining a second threat level for the network as a whole; and providing a report of a network security audit based on the first and second threat levels.

In one feature of this aspect further comprises receiving user input that defines a security policy; retrieving running configuration from the network elements; and validating the security policy against the running configuration. In another feature, the security policy is defined for the network as a whole. In yet another feature, the security policy comprises one or more individual security policies that are defined for one or more respective network elements.

In still another feature, the security policy is validated for the network as a whole. In another feature, the security policy is validated for one or more individual network elements. In a further feature, the security policy is defined based on a security template applicable to one or more network elements, wherein the templates define one or more automatic corrective actions that are performed in response to detecting a security breach at one or more network elements.

According to another feature, one or more alarms are raised in response to detecting a breach of the configured security policy for one or more network elements. In still another feature, determining a first threat level for each of the one or more network elements comprises selecting a threat level based on determining, for each of a plurality of ports and for a plurality of interfaces of the network elements, whether any of the ports is open on any of the interfaces, whether access to any port is restricted, and whether access to any port is restricted by an access control list. In yet another feature, the method further comprises receiving user input that defines a security policy and a network monitoring policy; retrieving running configuration from the network elements; validating the security policy against the running configuration; based on the network monitoring policy, monitoring and auditing the network for one or more potential violations of the security policy; and automatically performing one or more corrective actions in response to identifying one or more potential violations of the security policy.

According to another aspect, the invention provides a method comprising the machine-implemented steps of receiving user input that defines a security policy and a network monitoring policy, wherein the security policy is based on determining how information packets flow through the one or more network elements, determining a first threat level for each of the one or more network elements, and determining a second threat level for the network as a whole; retrieving running configuration from the network elements; validating the security policy against the running configuration; based on the network monitoring policy, monitoring and auditing the network for one or more potential violations of the security policy; and automatically performing one or more corrective actions in response to identifying one or more potential violations of the security policy.

In other aspects, the invention encompasses a computer apparatus and a computer-readable medium configured to carry out the foregoing steps.

2.0 Structural and Functional Overview

According to one embodiment, modeling the information flow among network elements helps to define various security levels and to assess network security against the defined levels. The vulnerability of each network element is assessed based on the flow of information among the entities. The threat level for the network element is determined based on the cumulative data flow.

For example, the threat level for a Network Element is determined to be high or low based on various factors and tests. In one embodiment, the factors and tests include: determining whether ports of routers or switches are open or not; if port is open, determining whether the access to the port is restricted or not; if the access is restricted, then determining how much reliability the restriction has; determining if the port is protected by one or more access control lists (ACLs), etc. Such a static analysis helps in determining what entity posses what security threat. A failed attempt on an open port is cached and verified.

Security event management is one of the methods by which an organization can become and remain compliant with applicable legislation. Security event management provides more granular oversight and identification of authorized and illegal user activity on a variety of network devices, for example, firewalls, IDS, routers, switches, and VPNs.

To achieve a useful and effective security management approach, the inventors hereof have identified the following broad goals:

1. Reporting on inbound and outbound network traffic, intrusion events, known security threats, configuration changes, denied connections, and technology flaws, such as TCP/IP problems.

2. Maintaining a historical repository of events that can be analyzed to identify known internal and external threats. Compliance regulations are clear in their call for log analysis and retention. If companies have a database that represents all events happening on their networks, they can better learn what went wrong. Such a repository can also help in tracking and prosecuting perpetrators. When a potential security breach occurs, such as a hacker, disgruntled employee, virus, or worm, a company can consult the repository to pinpoint the breach and distinguish a virus from a hacker, and both from a confused legitimate user.

3. Support controls to manage, monitor, audit, enforce, and report user activity against the institution's intended rules, policies, permissions and practices.

4. Continually adjust to identify known threats, creating a pro-active front-line defense for identifying and monitoring emerging threats.

5. Provide event activity reports that help management make informed security and network-related decisions consistent with regulatory requirements, corporate policies, and business goals.

According to one embodiment, a network security intelligence framework is provided and can be used to perform a unified, compliant, and dynamic network audit based on the information flow generated in the network. In one embodiment, the network security intelligence framework is implemented as a software engine with logical functional elements that provide and perform the following structure and functions.

1. The engine provides for a user to define security policy for individual network devices and for a group of network devices or a network as a whole. A security policy is defined, in one embodiment, using one or more XML-based system defined templates, or templates that are automatically generated from rules defined by the user.

2. The engine provides intelligence for verification and validation of rules that have been set on security devices from different vendors.

3. The engine collects security event log data based on the rules defined above, to create a complete picture of network usage.

4. The engine verifies security policy compliance and generates alerts for possible security breaches. In one embodiment, the engine retrieves a running configuration from a network device, and searches the running configuration for security configuration commands that are required as defined in the policy. If required configuration commands are absent, then alerts are generated.

5. The engine analyzes and reports on network performance. For example, the engine periodically determines the round trip time (RTT) of packets that are communicated between one network element and another network element. Performance metrics that fall below thresholds, as specified in the policy, are alerted.

6. The engine takes corrective actions based on the policy dynamically.

7. To facilitate implementing high security measures or policies at individual devices or for the network as a whole, the engine suggests to a user the level of security that the user needs to apply based on analysis of network performance under different security models.

3.0 Method of Providing a Unified Compliant Network Audit

Referring now to FIG. 1, at step 100, one or more configuration policies relating to security are defined. For example, a user defines a named policy comprising a set of one or more configuration commands that must be contained within the running configuration of each network device in a network.

At step 102, the configuration policy is applied. In one embodiment, applying the configuration policy comprises associating the defined policy with one or more network devices based on an address, name or other unique identifier of the devices, and determining whether the associated network devices conform to the configuration policy. The determining step may involve retrieving a running configuration from each device using an SNMP GET operation, transiently storing the running configuration in a memory workspace, and comparing the retrieved configuration to the configuration policy.

At step 104, the network is monitored and audited for possible violations of the configuration policy. For example, in one embodiment, the engine described above monitors changes to the running configuration of devices that are associated with a configuration policy. In one embodiment, monitoring involves subscribing the engine, using an event bus or other middleware, to events that the devices publish when users apply configuration changes to the devices. As events occur, the engine requests or receives a copy of the configuration changes that were just applied. The engine compares the configuration changes to the configuration policy to determine whether compliance exists.

Monitoring and auditing also may comprise creating and storing flow records that aggregate or summarize inbound and outbound network traffic, including protocol identifiers, source identifiers, and destination identifiers. Monitoring and auditing also may comprise storing records of network intrusion events. Monitoring and auditing also may comprise storing records of known security threats, as the threats are identified in the network. Monitoring and auditing also may comprise storing records of denied connections. For example, in response to a network device receiving a request for a Telnet connection that provides the wrong password, or in response to receiving from an application an SNMP request with an invalid SNMP community string, the engine may store a record indicating that a connection was requested and denied. Monitoring and auditing also may comprise storing records that identify technology flaws in the network, such as information identifying devices that use versions of TCP/IP that are subject to SYN segment flooding attacks or spurious RST segment attacks.

A separate monitoring policy definition may drive the monitoring and auditing step. For example, the monitoring policy may specify what monitoring operations to perform, monitoring intervals, what events to subscribe to, etc.

At step 106, one or more corrective actions are taken based upon the results of monitoring and auditing at step 104. Corrective actions may include generating or raising alarm messages. Corrective actions also may include performing automatic changes to configuration. For example, the engine may retrieve a running configuration from a device, determine that the configuration commands do not comply with policy, create a copy of the running configuration with one or more added commands that make the configuration comply with policy, and request user confirmation to apply the modified policy. Upon receiving user input that confirms the modifications, the modified policy may be applied to the device.

At step 108, the configuration and monitoring policies are reviewed. For example, a network administrator may open and display, in a user interface, information representing a configuration policy and a monitoring policy. The user may use editing commands to define changes to the policies. The changes in the policies may be informed by the user's experience in reviewing the results of the monitoring, auditing, and corrective actions. Alternatively, for the review step, the engine may display suggested changes in policies based on observed violations of the policy and based on the corrective actions that have occurred.

The foregoing information flow model enables a user to define a security policy for each of network element in a managed network, so that the threat levels of individual network elements can be assessed based on the policy.

Figure 2:
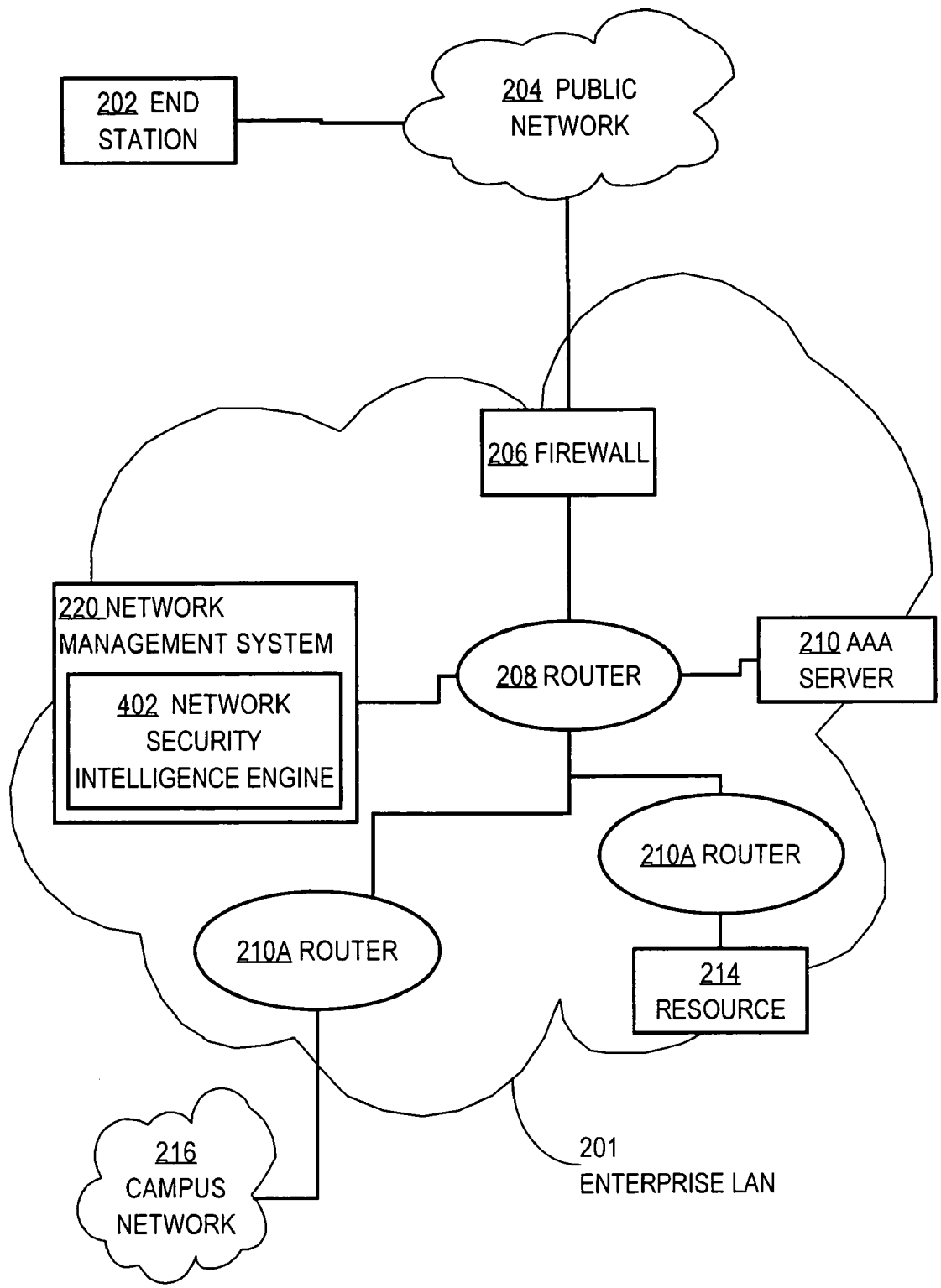
FIG. 2 is a block diagram of an example network that can be used in an embodiment.

FIG. 2 is a block diagram of an example network that can be used in an embodiment. An end station 202 is coupled to a public network 204, which may be any LAN, WAN, one or more internetworks, or the Internet. Public network 204 is coupled to a firewall 206 that protects one or more resources 214 in an enterprise LAN 201. Firewall 206 is coupled to a router 208 that provides admission control and access control services, supported by an authentication, authorization and accounting (AAA) server 210.

Router 208 is coupled to one or more other routers 210A, 210B that are respectively coupled to resources 214 or other networks such as campus network 216. Resource 214 is any private resource of an enterprise, such as a content server, database server, etc. Router 208 is further coupled to a network management station 220 that hosts a network security intelligence engine 402, which is described further below with respect to FIG. 4. In one embodiment, network security intelligence engine 402 comprises one or more computer programs or other software elements that implement the functions and methods described herein.

According to an embodiment, the scope of allowed information flows among network elements such as router 206, AAA server 210, and routers 208, 210A, 210B are determined and used to apply a security threat level to each of the individual network elements as well as the network as a whole. For example, if all ports of firewall 206 are open, then a high security threat level could be applied to the firewall. If one port of firewall 206 is open but protected with an access control list, then a moderate security threat level could be applied. The presence of one element in network 201 with a high threat level could result in associating a high threat level with the network as a whole, or the network threat level value could be scaled. For example, a mean or median threat level value could be calculated based on individual threat level values of all network elements.

Figure 3B:
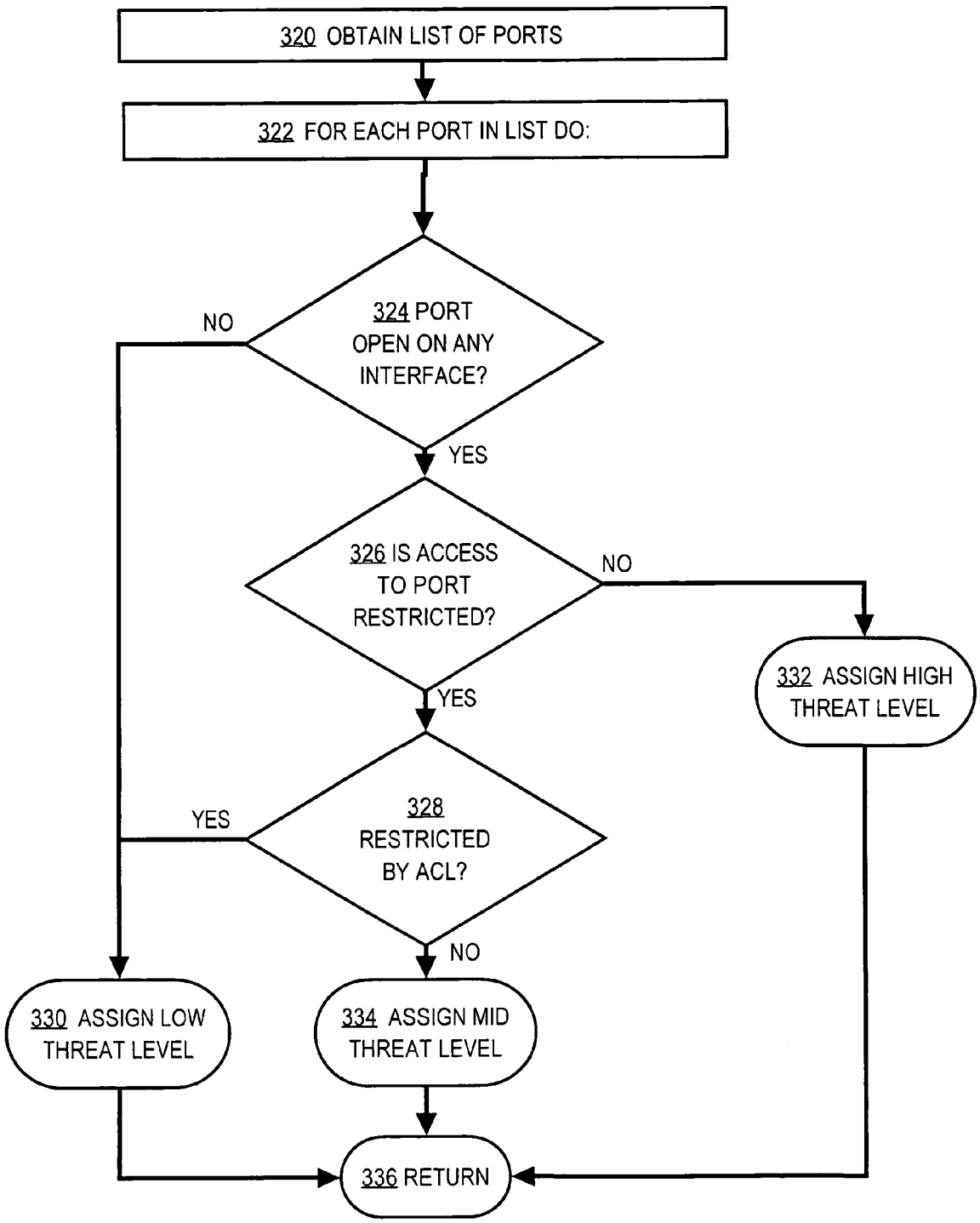
FIG. 3B is a flow diagram that illustrates a high level overview of one embodiment of a method for assigning a threat level to a network element.

FIG. 3A is a flow diagram that illustrates a high level overview of one embodiment of a method for performing a network security audit; FIG. 3B is a flow diagram that illustrates a high level overview of one embodiment of a method for assigning a threat level to a network element. For purposes of illustrating a clear example, in the description herein, FIG. 3A and FIG. 3B are described with reference to the network context of FIG. 2. However, the broad techniques described herein may be used in many other network contexts.

Referring first to FIG. 3A, in step 302, a network inventory is obtained. For example, network security intelligence engine 402 accesses an inventory database that is maintained separately by a network management program hosted at network management station 220. The inventory database comprises records identifying and describing all managed network elements in networks 201, 216. Thus, network security intelligence engine 402 can access the inventory database to identify router 206, AAA server 210, and routers 208, 210A, 210B.

At step 304, a network element is selected. Steps 304 to 310, inclusive, represent a loop that iterates through all network elements found in the inventory. At step 306, the process determines how information flows through the selected network element. As an example, the techniques of FIG. 3B may be used to make the determination. Step 306 generally involves determining what information is allowed to enter and exit the selected network element, what security-oriented configuration commands form part of the running configuration or startup configuration of the selected network element, and what security-oriented rules are present in the selected network element. Collectively, this information can be correlated with a threat level value for the network element.

At step 308, a threat level for the selected network element is determined. A threat level may be determined as shown in FIG. 3B based on the results of step 304. In one embodiment, a threat level is low, moderate or high. In another embodiment, a threat level is an integer from 0 to 9 or 1 to 10. The threat level represents the ease with which threatening, non-secure or untrusted data can flow through the selected network element. The threat level is stored in memory or persistent storage that is accessible to network security intelligence engine 402.

In step 310 a test is performed to determine if more network elements are in the inventory. If so, control returns to step 304 to repeat steps 304 to 308 for other network elements. If the process has iterated through all network elements in the inventory, then control passes to step 312, at which a threat level for the network as a whole is determined. Any of several approaches may be used to determine a network-wide threat level. For example, the network-wide threat level may be set to "High" if any element in the network has a "High" threat level value. Alternatively, the network-wide threat level may be the mean or median of all threat level values for all network elements.

At step 314, a report of the network security audit is provided. Step 314 may involve generating and displaying a graphical user interface that identifies network devices and threat levels. Step 314 may involve generating individual alert messages for each network element that has a High or Moderate threat level. Step 314 also can include logging, sending alerts to other systems, programs, or persons, generating events, etc.

Referring now to FIG. 3B, for determining a threat level for a particular selected network element, in step 320, a list of ports is obtained. The list obtained in step 320 may comprise a list of well-known ports that is stored in a configuration file for the network security intelligence engine 402. Alternatively, the list in step 320 may be obtained from the selected device using a management interface such as SNMP. The specific mechanism for obtaining a list of ports at step 320 is not critical. What is important is that some mechanism provides the network security intelligence engine with a list of ports that are supported or used in the selected network element.

At step 322, for each port in the list, a logical loop represented by step 324 to step 334 is performed. At step 324, a test is performed to determine if the current port is open on any interface of the network element. If the port is not open, then a low threat level is assigned at step 330, and control returns to step 322 to repeat the process for the next port.

If the current port is open, then in step 326 a test is performed to determine if access to the port is restricted. If the port is open and has no access restrictions, then in step 332 a high threat level is assigned. In one alternative, control passes to step 336 to return to consider other ports. In another alternative, determining that a high threat level exists for any port is sufficient, and other ports can be skipped.

If access to the port is restricted, then at step 328, a test is performed to determine if access to the port is restricted using an acceptable restriction mechanism such as an access control list (ACL). If access is restricted using an ACL, a low threat level is assigned at step 330. If not, then a moderate threat level is assigned at step 334.

Remaining ports are considered by looping from step 336 to step 324. As a result, all ports and interfaces are considered, and a threat level is assigned to the network element based on how information can flow through the device.

Figure 4:
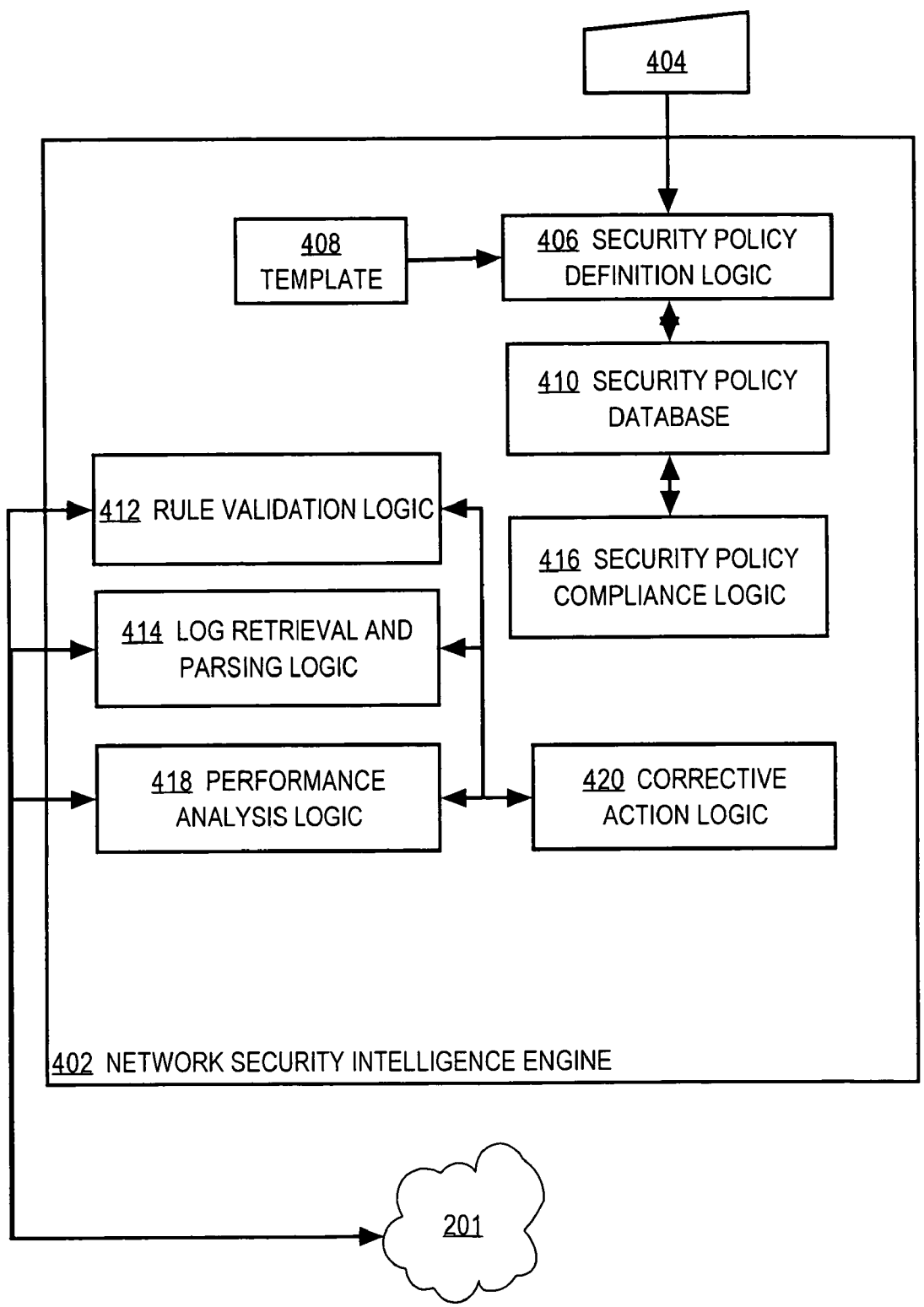
FIG. 4 is a block diagram of an example network security intelligence engine.

FIG. 4 is a block diagram of an example network security intelligence engine 402. User input 404 is received at security policy definition logic 406, which also can receive input from one or more security policy templates 408. The security policy definition logic 406 implements the functions described above for defining one or more security policies respectively applicable to one or more network elements. The security policy definition logic 406 stores completed security policies in a security policy database 410.

Security policy compliance logic 416 measures compliance of particular network elements with defined security policies stored in database 410. As described above, measuring compliance may involve retrieving a running configuration from a specified network element, comparing configuration commands in the running configuration to the security policy. In response to determining that a variance exists, security policy compliance logic 416 generates alerts, logs the variance, or takes other action.

Corrective action logic 420 receives results from security policy compliance logic 416 and recommends or automatically performs remedial measures that will place a network element in compliance with the stored policy. Remedial measures may involve adding one or more configuration commands or parameters to the configuration of the network element, deleting commands or parameters, or modifying commands or parameters.

Network security intelligence engine 402 further comprises rule validation logic 412, log retrieval and parsing logic 414, and performance analysis logic 418. In one embodiment, rule validation logic 412 implements the functions of FIG. 3A, FIG. 3B described above. Log retrieval and parsing logic 414 is configured to retrieve event logs from network management system 220 and from network elements, and to parse the event logs to identify significant security events. Examples of significant security events include refused attempts to access ports of monitored network elements.

Performance analysis logic 418 is configured to analyze performance aspects of a network as a whole, or for particular links between network elements, to provide further input for a network audit. For example, link failures may indicate that particular network elements linked by the failed links have increased security vulnerability. Network element failures may indicate the existence of successful denial-of-service attacks. Performance analysis logic 418 may use such information to modify a threat level for particular network elements or the network as a whole.

4.0 Implementation Mechanisms—Hardware Overview

Figure 5:
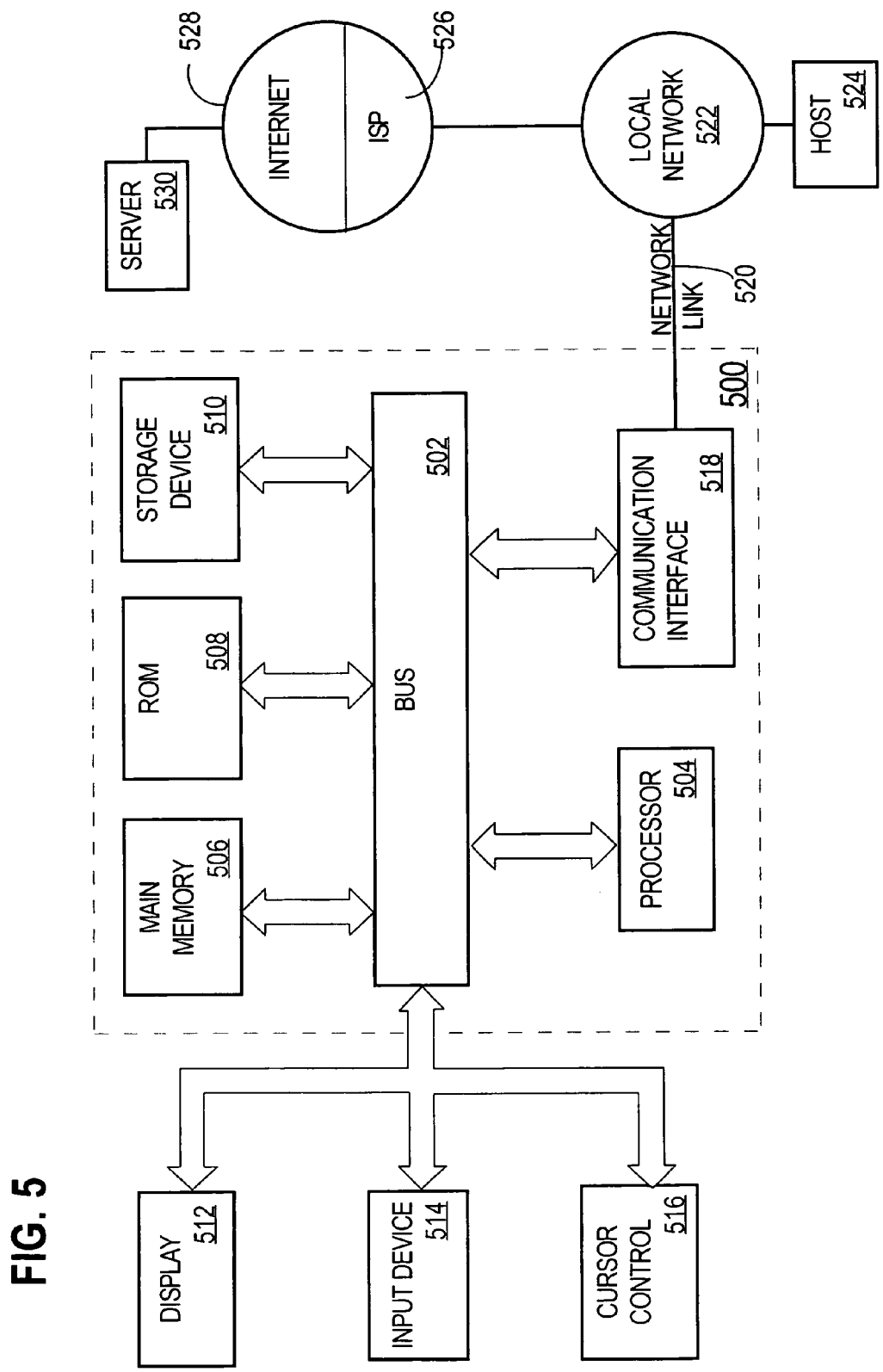
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for providing a unified compliant network audit. According to one embodiment of the invention, providing a unified compliant network audit is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for providing a unified compliant network audit as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of performing a network security audit based on information flows among network elements, comprising the machine-implemented steps of:
   obtaining a network inventory that identifies one or more network elements of a packet-switched network;
   obtaining a list of ports;
   determining, based at least in part on an examination of a running configuration of each of the one or more network elements, how information packets flow through each port in the list of ports for each of the one or more network elements;
   determining a first threat level for each port in the list of ports for each of the network elements based at least in part on:
      whether the running configuration indicates that the port is open or closed;
      whether the running configuration indicates that the port, if open, has been configured with restrictions;
   determining a second threat level for each of the one or more network elements based, at least in part, on the first threat levels associated with each port in the list of ports for that network element;
   determining a third threat level for the network as a whole; and
   providing a report of a network security audit based on the first, second and third threat levels;
   wherein the method is performed by one or more computing devices.

2. The method of claim 1, further comprising receiving user input that defines a security policy; retrieving running configuration from the network elements; and validating the security policy against the running configuration.

3. The method of claim 2, wherein the security policy is defined for the network as a whole.

4. The method of claim 2, wherein the security policy comprises one or more individual security policies that are defined for one or more respective network elements.

5. The method of claim 2, wherein the security policy is validated for the network as a whole.

6. The method of claim 2, wherein the security policy is validated for one or more individual network elements.

7. The method of claim 2, wherein the security policy is defined based on a security template applicable to one or more network elements, wherein the templates define one or more automatic corrective actions that are performed in response to detecting a security breach at one or more network elements.

8. The method of claim 7, wherein one or more alarms are raised in response to detecting a breach of the configured security policy for one or more network elements.

9. The method of claim 1, wherein determining a first threat level comprises determining whether access to the port is restricted by an access control list.

10. The method of claim 1, further comprising the machine-implemented steps of:
    receiving user input that defines a security policy and a network monitoring policy;
    retrieving running configuration from the network elements;
    validating the security policy against the running configuration;
    based on the network monitoring policy, monitoring and auditing the network for one or more potential violations of the security policy; and
    automatically performing one or more corrective actions in response to identifying one or more potential violations of the security policy.

11. A computer-readable volatile or non-volatile medium for performing a network security audit based on information flows among network elements, comprising one or more sequences of computer program instructions, which instructions, when executed by one or more processors, cause the one or more processors to perform the steps of:
    obtaining a network inventory that identifies one or more network elements of a packet-switched network;
    obtaining a list of ports;
    determining, based at least in part on an examination of a running configuration of each of the one or more network elements, how information packets flow through each port in the list of ports for each of the one or more network elements;
    determining a first threat level for each port in the list of ports for each of the network elements based at least in part on:
       whether the running configuration indicates that the port is open or closed; and
       whether the running configuration indicates that the port, if open, has been configured with restrictions;
    determining a second threat level for each of the one or more network elements based, at least in part, on a status of one or more ports used by the one or more network elements and determining whether access to any port is restricted the first threat levels associated with each port in the list of ports for that network element;
    determining a third threat level for the network as a whole; and
    providing a report of a network security audit based on the first, second, and third threat levels.

12. The computer-readable volatile or non-volatile medium of claim 11, further comprising program instructions for receiving user input that defines a security policy; retrieving running configuration from the network elements; and validating the security policy against the running configuration.

13. The computer-readable volatile or non-volatile medium of claim 12, wherein the security policy is defined for the network as a whole.

14. The computer-readable volatile or non-volatile medium of claim 12, wherein the security policy comprises one or more individual security policies that are defined for one or more respective network elements.

15. The computer-readable volatile or non-volatile medium of claim 12, wherein the security policy is validated for the network as a whole.

16. The computer-readable volatile or non-volatile medium of claim 12, wherein the security policy is validated for one or more individual network elements.

17. The computer-readable volatile or non-volatile medium of claim 12, wherein the security policy is defined based on a security template applicable to one or more network elements, wherein the templates define one or more automatic corrective actions that are performed in response to detecting a security breach at one or more network elements.

18. The computer-readable volatile or non-volatile medium of claim 17, wherein one or more alarms are raised in response to detecting a breach of the configured security policy for one or more network elements.

19. The computer-readable volatile or non-volatile medium of claim 11, wherein determining a first threat level comprises determining whether access to the port is restricted by an access control list.

20. The computer-readable volatile or non-volatile medium of claim 11, further comprising the machine-implemented steps of:
   receiving user input that defines a security policy and a network monitoring policy;
   retrieving running configuration from the network elements;
   validating the security policy against the running configuration;
   based on the network monitoring policy, monitoring and auditing the network for one or more potential violations of the security policy; and
   automatically performing one or more corrective actions in response to identifying one or more potential violations of the security policy.

21. An apparatus configured for performing a network security audit based on information flows among network elements, comprising:
   security policy definition logic;
   a security policy database coupled to the security policy definition logic;
   security policy compliance logic coupled to the security policy database; and
   corrective action logic;
   wherein the security policy compliance logic comprises one or more computer program instructions for obtaining a network inventory that identifies one or more network elements of a packet-switched network; obtaining a list of ports: determining, based at least in part on an examination of a running configuration of each of the one or more network elements, how information packets flow through each port in the list of ports for each of the one or more network elements; determining a first threat level for each port in the list of ports for each of the network elements based at least in part on: whether the running configuration indicates that the port is open or closed: whether the running configuration indicates that the port, if open, has been configured with restrictions; determining a second threat level for each of the one or more network elements based, at least in part, on a the first threat levels associated with each port in the list of ports for that network element; determining a third threat level for the network as a whole; and providing a report of a network security audit based on the first second, and third threat levels.

22. The apparatus of claim 21, wherein the security policy compliance logic further comprises receiving user input that defines a security policy; retrieving running configuration from the network elements; and validating the security policy against the running configuration.

23. The apparatus of claim 22, wherein the security policy is defined for the network as a whole.

24. The apparatus of claim 22, wherein the security policy comprises one or more individual security policies that are defined for one or more respective network elements.

25. The apparatus of claim 22, wherein the security policy is validated for the network as a whole.

26. The apparatus of claim 22, wherein the security policy is validated for one or more individual network elements.

27. The apparatus of claim 22, wherein the security policy is defined based on a security template applicable to one or more network elements, wherein the templates define one or more automatic corrective actions that are performed in response to detecting a security breach at one or more network elements.

28. The apparatus of claim 27, wherein one or more alarms are raised in response to detecting a breach of the configured security policy for one or more network elements.

29. The apparatus of claim 22, wherein determining a first threat level comprises determining whether access to the port is restricted by an access control list.

30. The apparatus of claim 21, further comprising the machine-implemented steps of:
   receiving user input that defines a security policy and a network monitoring policy;
   retrieving running configuration from the network elements;
   validating the security policy against the running configuration;
   based on the network monitoring policy, monitoring and auditing the network for one or more potential violations of the security policy; and
   automatically performing one or more corrective actions in response to identifying one or more potential violations of the security policy.

31. An apparatus configured for performing a network security audit based on information flows among network elements, comprising:
   means for obtaining a network inventory that identifies one or more network elements of a packet-switched network;
   means for obtaining a list of ports;
   means for determining, based at least in part on an examination of a running configuration of each of the one or more network elements, how information packets flow through each port in the list of ports for each of the one or more network elements;
   means for determining a first threat level for each port in the list of ports for each of the network elements based at least in part on:
      whether the running configuration indicates that the port is open or closed;
      whether the running configuration indicates that the port, if open, has been configured with restrictions;
   means for determining a second threat level for each of the one or more network elements based, at least in part, on the first threat levels associated with each port in the list of ports for that network element;
   means for determining a third threat level for the network as a whole; and means for providing a report of a network security audit based on the first, second, and third threat levels.

32. The apparatus of claim 31, further comprising means for receiving user input that defines a security policy; means for retrieving running configuration from the network elements; and means for validating the security policy against the running configuration.

33. The apparatus of claim 32, wherein the security policy is defined for the network as a whole.

34. The apparatus of claim 32, wherein the security policy comprises one or more individual security policies that are defined for one or more respective network elements.

35. The apparatus of claim 32, wherein the security policy is validated for the network as a whole.

36. The apparatus of claim 32, wherein the security policy is validated for one or more individual network elements.

37. The apparatus of claim 32, wherein the security policy is defined based on a security template applicable to one or more network elements, wherein the templates define one or more automatic corrective actions that are performed in response to detecting a security breach at one or more network elements.

38. The apparatus of claim 37, wherein one or more alarms are raised in response to detecting a breach of the configured security policy for one or more network elements.

39. The apparatus of claim 32, wherein determining a first threat level comprises determining whether access to the port is restricted by an access control list.

40. The apparatus of claim 31, further comprising the machine-implemented steps of:

receiving user input that defines a security policy and a network monitoring policy;

retrieving running configuration from the network elements;

validating the security policy against the running configuration;

based on the network monitoring policy, monitoring and auditing the network for one or more potential violations of the security policy; and automatically performing one or more corrective actions in response to identifying one or more potential violations of the security policy.

* * * * *

UNITED STATES PATENT AND TRADEMARK OFFICE
CERTIFICATE OF CORRECTION

PATENT NO. : 7,735,140 B2 Page 1 of 1
APPLICATION NO. : 11/148489
DATED : June 8, 2010
INVENTOR(S) : Krishnam Raju Dalta et al.

It is certified that error appears in the above-identified patent and that said Letters Patent is hereby corrected as shown below:

Column 12
Claim 11: lines 50-53. Delete "a status of one or more ports used by the one or more network elements and determining whether access to any port is restricted".

Signed and Sealed this

Thirty-first Day of August, 2010

David J. Kappos
*Director of the United States Patent and Trademark Office*